(12) United States Patent
Kress et al.

(10) Patent No.: US 6,676,340 B2
(45) Date of Patent: Jan. 13, 2004

(54) TOOL AND METHOD FOR MACHINING WORKPIECES

(75) Inventors: Dieter Kress, Aalen (DE); Friedrich Häberle, Lauchheim (DE)

(73) Assignee: Mapal Fabrik für Präzisionswerkzeug Dr. Kress KG (DE)

( * ) Notice: Subject to any disclaimer, the term of this patent is extended or adjusted under 35 U.S.C. 154(b) by 144 days.

(21) Appl. No.: 09/950,525

(22) Filed: Sep. 10, 2001

(65) Prior Publication Data

US 2002/0071730 A1 Jun. 13, 2002

(51) Int. Cl.[7] .............................................. B23B 51/00
(52) U.S. Cl. ................ 408/24; 407/1; 407/31; 408/30; 408/226; 408/227; 409/139
(58) Field of Search ................. 409/137, 138, 409/139, 140, 132; 407/1, 31, 32; 408/1 R, 67, 22, 24, 26, 27, 30, 36, 226, 227, 223, 224

(56) References Cited

U.S. PATENT DOCUMENTS

| | | | | |
|---|---|---|---|---|
| 1,300,325 A | * | 4/1919 | Baumann | 408/144 |
| 2,437,822 A | * | 3/1948 | Jones | 82/1.4 |
| 2,486,363 A | * | 10/1949 | Purvis | 15/105 |
| 2,663,203 A | * | 12/1953 | Fried et al. | 408/154 |
| 2,847,884 A | * | 8/1958 | Favre et al. | 408/26 |
| 3,142,080 A | * | 7/1964 | Nelson | 15/106 |
| 3,227,012 A | * | 1/1966 | Lemelson | 408/67 |
| 3,307,254 A | * | 3/1967 | Williams | 407/1 |
| 3,940,214 A | * | 2/1976 | Waschek | 408/26 |
| 4,251,175 A | * | 2/1981 | Hara et al. | 409/140 |
| 4,333,727 A | * | 6/1982 | Bennett | 408/191 |
| 5,035,551 A | * | 7/1991 | Neumann | 408/224 |

FOREIGN PATENT DOCUMENTS

| | | | | |
|---|---|---|---|---|
| DE | 297353 | * | 1/1992 | 409/139 |
| EP | 0413847 | | 2/1992 | |
| GB | 2106020 | * | 4/1983 | 407/1 |
| GB | 2211769 | * | 7/1989 | 409/139 |
| SU | 1745434 | * | 7/1992 | 409/140 |
| WO | WO 9110527 | | 7/1991 | |

* cited by examiner

Primary Examiner—Daniel W. Howell
(74) Attorney, Agent, or Firm—Ostrolenk, Faber, Gerb & Soffen, LLP

(57) ABSTRACT

A tool for machining workpieces, having at least one cutting edge which is fastened to a main body of the tool. A respective deburring device removes the burrs produced by each cutting edge during machining. The deburring device is supported at the main body near the cutting edge and is movable by an actuatable piston between a retracted storage position in the tool body and an extended active position out of the tool body for deburring after surface machining.

17 Claims, 3 Drawing Sheets

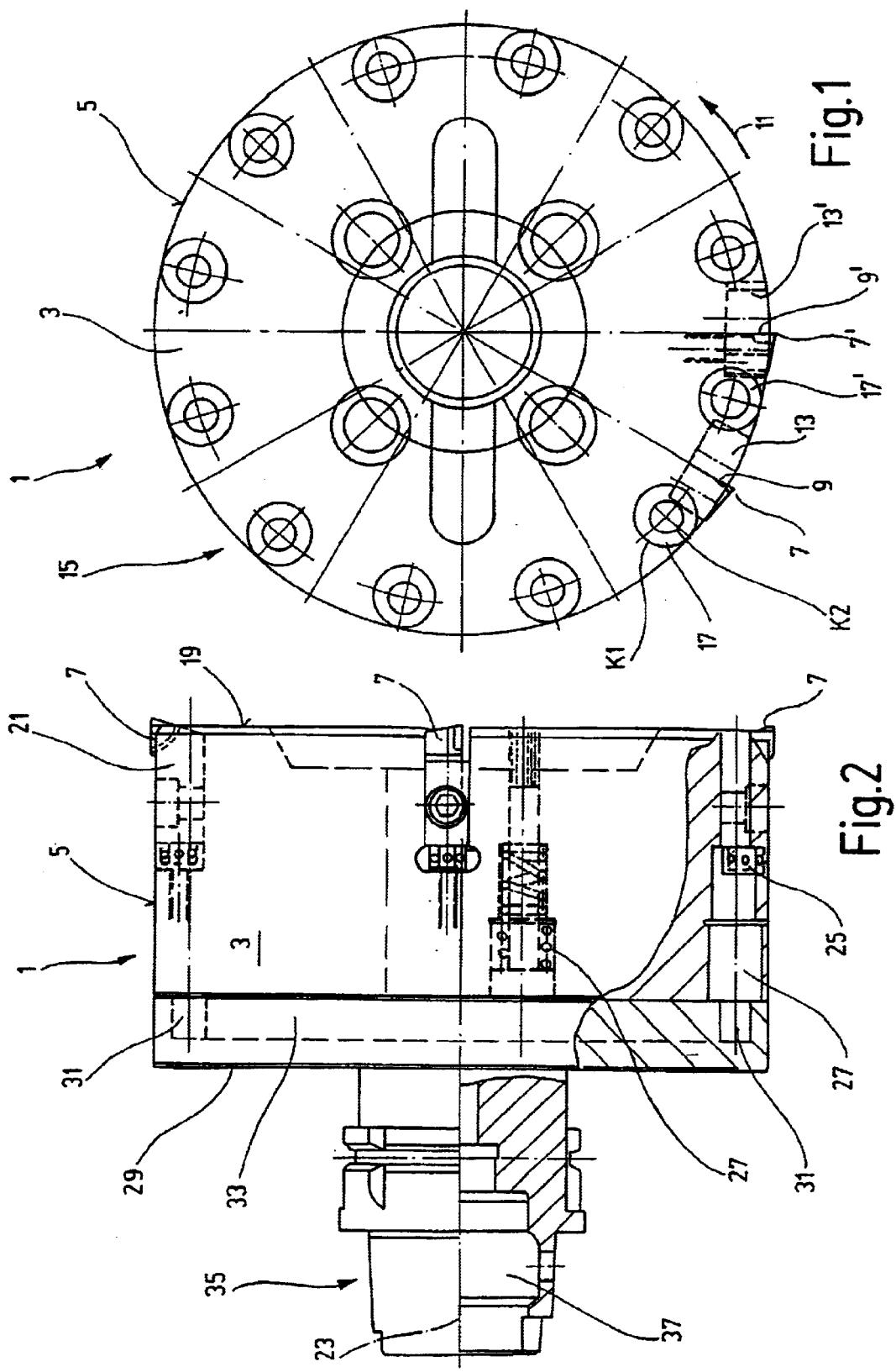

TOOL AND METHOD FOR MACHINING WORKPIECES

BACKGROUND OF THE INVENTION

The invention relates to a tool for both machining and deburring workpieces and to a method of machining and deburring workpieces.

Tools and methods of the type addressed here are known. In particular in machining installations, tools of various types are used to machine workpieces. It has been found that burrs develop in the process, and these burrs may lead to a permanent risk of injury. Therefore, deburring tools are used after machining of workpieces to remove the burrs and the risk of injury as far as possible. A second tool is required to remove the burrs produced during the machining. This requires a tool change in many cases. In machining installations, however, this is also a great disadvantage, since considerable space is required due to the various tools. Also, in general, providing such tools is very disadvantageous with regard to the parts held in stock.

SUMMARY OF THE INVENTION

It is therefore the object of the invention to provide a tool for machining workpieces that does not have the disadvantages noted above.

To achieve this object, a tool of the invention has both elements for machining a workpiece and then deburring it. It is distinguished by comprising a deburring device, which enables removing the burrs produced during the machining, without requiring the use of a separate tool.

In one embodiment of the tool, the deburring device interacts with an actuating device which ensures relative movement between a deburring tool and a cutting edge of the tool. It is possible to retract and extend the deburring tool so that, after machining a workpiece with the deburring tool retracted, the burr that was produced is removed by the deburring tool, which is then extended.

To achieve the object, a method of machining workpieces is also proposed, in which both the machining and the deburring of the workpiece are performed by the same tool.

Other objects and features of the invention are explained below with reference to the accompanying drawings.

BRIEF DESCRIPTION OF THE DRAWINGS

FIG. 1 is a diagrammatic view of a tool in plan view, namely of its end face;

FIG. 2 is a view of the tool in FIG. 1, in partial section;

DESCRIPTION OF A PREFERRED EMBODIMENT

Figure 4:
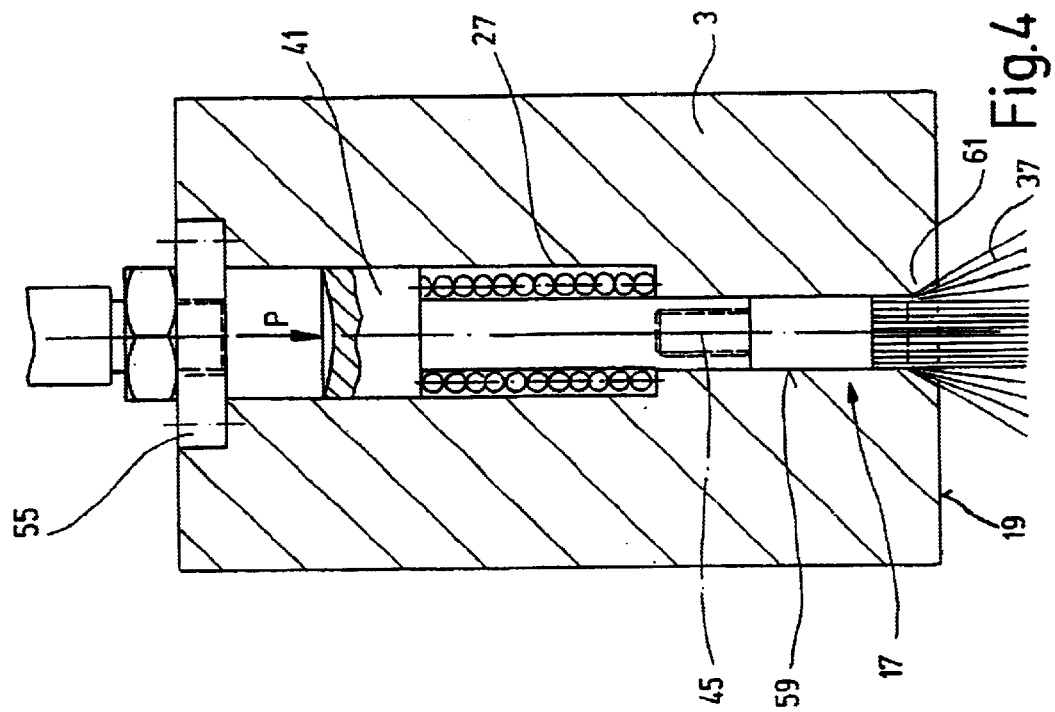
FIG. 4 is a view like FIG. 3 showing the deburring device in a second functional position.

FIG. 1 shows a tool 1 according to the invention including a main body 3 having circumferential peripheral surface 5. At least one cutting edge 7 projects outward beyond the surface. FIG. 1 shows two cutting edges 7 and 7' in this simplified diagrammatic drawing. There may be up to twelve cutting edges projecting beyond the surface 5 of the tool 1. The cutting edges 7 are part of a cutter tip 9 which is fastened to the main body 3 conventionally, for example, by a clamping jaw (not shown here) and a "cassette", which is preferably adjustable relative to the main body 3 such that the machining radius can be set precisely.

During machining of a workpiece, the tool 1 is normally rotated counterclockwise in FIG. 1, so that the cutting edges 7 of the cutter tips 9 can remove chips from the workpiece.

Viewed in the rotation direction of the tool 1 indicated by an arrow 11, a respective chip space 13, 13' for disposal of chips is located in front of, i.e. it leads each cutting edge 7, that is, in front of a cutter tip 9. Chips removed by the cutting edges 7, 7' therefore pass into the respective chip spaces 13, 13' and may be disposed of from the spaces.

The construction and functioning of a cutting tool are known in principle. It is essential that during rotation of the tool, chips are removed by the cutting edges from the workpiece to be machined. Machining generally produces burrs.

The tool 1 has a deburring device 15 which comprises at least one deburring tool 17 associated with one or more of the cutting edges 7. FIG. 1 shows a deburring tool 17' associated with the cutting edge 7'. Ten further deburring tools are provided here. Each tool is indicated by concentric circles K1, K2 at the periphery, as described below. A cutting edge or a cutter tip is associated with each deburring tool, and vice versa, providing as many cutting edges or cutter tips as deburring tools. Instead of providing individual deburring tools assigned to the individual cutting edges, a single, possibly also larger, deburring tool may be assigned to a plurality of cutting edges. However, the number of cutting edges or cutter tips and deburring tools is not critical for the functioning of the tool 1.

The tool shown in FIG. 1 is shown in side view in FIG. 2, parts of the tool 1 being sectioned.

FIG. 2 shows a plurality of the cutter tips 9, each projecting beyond the peripheral surface 5 of the body 3 of the tool 1 and having cutting edges 7 which also project forward beyond the end face 19 of the tool 1. For example, the tool 1 shown is a face milling cutter.

FIG. 2 shows cassettes 21, which are fastened to the main body 3 of the tool 1. The cutter tips 9 are clamped in position on the cassettes in a conventional manner. Each cassette is adjustable in the direction of the center axis 23 of the tool 1 by a known type of adjusting device 25 schematically indicated. The devices 25 serve to displace the cutter tips 9 to a greater or lesser extent beyond the end face 19 of the tool 1. Corresponding adjustability in the radial direction, perpendicular to the center axis, may also be provided.

Recesses 27 in the body 3 of the tool 1 running parallel to the center axis 23 accommodate respective deburring tools 17, as explained with reference to FIGS. 3 and 4.

On its axial side opposite the end face 19, the main body 3 has a flange 29 secured to it which comprises branch passages 31 that extend in the direction of the center axis 23 and are connected to one another, for example, by one or more annular passages 33. These form a media connection with the recesses 27.

The tool 1 may be connected with the flange 29 and a known fastening shank 35 to a machine tool or a machining installation, not shown. The partial sectional view of FIG. 2 shows that the fastening shank is hollow with an interior space 37 which provides a media connection to the annular passage 33, and thus to the branch passages 31 and the recesses 27, and a coolant/lubricant can be fed to the cutting edges.

As supplying tools with coolant and/or lubricant or other media via a shank is known in principle, this is not dealt with in more detail.

Figure 3:
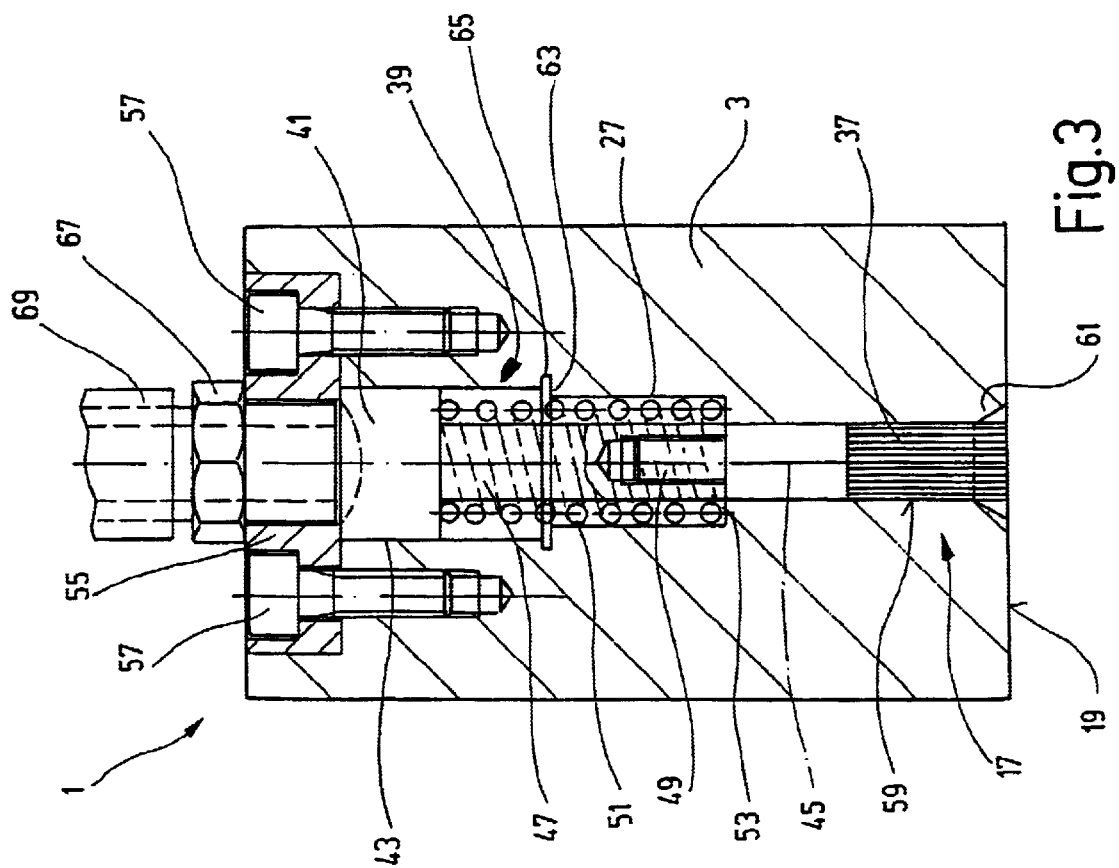
FIG. 3 is a detail of the tool, particularly a deburring device, in a first functional position.

FIG. 3 shows a deburring tool 17 of the tool 1 in section and on a greatly enlarged scale. A recess 27 in the main body 3 comprises a stepped bore that accommodates the deburring tool 17. The tool 17 comprises a wire brush 37, and a fastening device 39. The brush preferably has an abrasion resistant coating thereon. The device 39 comprises an actuating piston 41 disposed in a sealing manner in the top region 43 of the recess 27 which can be displaced along the direction of the longitudinal axis 45 of the recess 27. The actuating piston 41 has an underside which faces the axial end face 19 of the tool 1. An actuating pin 47 attached to the underside of the piston 41 has a wire brush 37 fastened to it, for example, screwed on by a threaded stud 49. The outside diameter of the actuating pin 47 is smaller than the inside diameter of the recess 27, leaving space for an elastic element, here a helical spring 51, around the actuating pin. The helical spring 51 is supported between a bottom step of the recess 27 and on the underside of the actuating piston 41 and is preloaded in the recess 27. The helical spring 51 therefore presses the actuating piston 41 upward. The piston 41 is supported on a suitable abutment, here a closure plate 55. The plate is attached in the body 3 of the tool 1 and is fixed there by means of fastening screws 57.

FIG. 3 shows the actuating piston 41 located in its top first functional position, on the stop at the closure plate 55, where the deburring device 15 or the deburring tool 17 is inactivated, with the wire brush 37 is pulled filly into the bottom part 59 of the recess 27 and not projecting beyond the end face 19 of the tool 1.

The orifice region of the bottom part 59 in the end face 19 has a conically widened portion 61, which is schematically indicated in FIG. 1 by the concentric circles K1 and K2.

When the actuating piston 41 is displaced from its position shown in FIG. 3 and against the force of the helical spring 51 downward into its second functional position, it eventually strikes a top step 63 of the recess 27, for example a stop ring 65, which is inserted into the recess 27 and is arranged concentrically to the longitudinal axis 45.

A connection piece 67 is attached to the closure plate 55. This connects the recess 27 to a media supply via a connection hose 69. It is possible to build up positive pressure on the top side of the actuating piston 41, remote from the end face 19, for example by compressed air or a hydraulic fluid. This builds up a downwardly directed force which is eventually larger than the counterforce of the helical spring 51. This displaces the actuating piston 41, and the actuating pin 47 and the deburring tool 17, that is the wire brush 37, downward.

FIG. 4 shows the actuating piston 41 displaced downward and the deburring tool 17 or the wire brush 37 extended beyond the end face 19. The widened portion 61 enables the wire brush 37 to fan out, as shown in FIG. 4.

FIG. 4 shows an embodiment which is slightly modified compared with FIG. 3, wherein the closure plate 55 is slightly smaller. However, the basic structures of the deburring tool 17 and of the actuating device 39 are identical.

In FIG. 4, the top step 63 and the stop ring 65 are not present. Downward movement of the actuating piston 41 is limited by the helical spring 51 being fully compressed, wherein all of the spring coils bear against one another and further compression is not possible.

In this actuating device 39 in FIG. 4, downwardly directed movement of the actuating piston 41, the actuating pin 57 and the deburring tool 17 or the wire brush 37 requires that the actuating piston 41 be acted upon on its top side by a pressure P which is greater than the counterforce of the helical spring 51. This extends the deburring tool 17 beyond the end face 19 of the tool 1 making it available for deburring.

To build up the pressure P, it is not critical whether a pressurized medium is admitted to the recess 27 above the actuating piston 41 via a connection piece 67, as shown in FIGS. 3 and 4, or via a flange 29, shown in FIG. 2. This is because, if a pressurized medium is admitted to the annular passage 33, pressure is likewise built up in the branch passages 31. This pressure is then transmitted to the top side of the actuating piston 41 remote from the end face 19, so that the actuating piston 41 is finally displaced against the force of the helical spring 51, causing the deburring tool 17 to extend from the body 3 of the tool 1.

The actuating device 39 has pressure applied to the actuating piston 41, whether by means of a gaseous or liquid medium, to activate the deburring device 15 and push out the deburring tool 17, that is the wire brush 37, beyond the end face 19 of the tool 1 against the force of a restoring device, which comprises the helical spring 51 for example.

When the pressure on the top side of the actuating piston 41 is reduced, the helical spring 51 pushes the actuating piston and the deburring tool 17 back into the initial position and the wire brush 37 is displaced back into the body 3 of the tool 1.

The functioning of the tool and the method of machining workpieces is now described.

In a first machining step, the tool 1 removes chips from a workpiece. In the process, it is ultimately not important whether the tool 1 is a milling cutter, as in FIGS. 1 and 2, or another type of tool used for machining, for example a reamer. During the machining, the cutting edges 7 project beyond the circumferential surface 5 and if necessary, beyond the end face 19 of the body 3 of the tool 1 and can remove chips from the workpiece. During this operation mode of the tool 1, the deburring device 15 is inactivated, with the deburring tool 17 or the wire brush 37 pulled into the body 3. After machining, the tool 1 is lifted from the workpiece to be machined and moved back into its initial position. The deburring device 15 is now activated, with the deburring tool 17, here a wire brush 37, is extended from the body 3 such that the top surface of the workpiece can be processed with the deburring tool 17 in a further step of the method.

The following aspects are crucial. In a first step of the method, the workpiece is machined by the tool 1. In a second processing step, the workpiece is deburred directly with one and the same tool. To this end, relative movement is required between the cutting edges 7 and the deburring tools 17. In this example, the actuating device 39 prevents the wire brushes 37 or deburring tools 17, which are retracted, from contacting the surface of the workpiece but that instead the cutting edges 7 first remove chips. Then the deburring tools are extended for deburring the workpiece surface.

Movement of the cutting edges 7 is conceivable. The cutting edges 7 could first be extended far enough so that, during rotation of the tool 1, the edges extend further beyond the outer contour of the tool than the deburring tools or wire brushes. A workpiece may be machined in this functional position. After the machining, the cutting edges can be pulled in, so that the deburring tools may process the workpiece surface. Even if this functional mode were possible, the functional mode described first is preferred, since the cutting edges then do not need to be moved for the change of function of the tool 1 and can therefore be initially positioned very precisely in the main body 3. During retraction and extension of the deburring tools, particularly if they are designed as wire brushes, the distance to which the brushes are extended is not crucial. It is only crucial that the brushes project outward beyond the main body 3 further than the cutting edges 7 in order to carry out the deburring.

During the deburring of workpieces, wire brushes 37 with individual bristles that have an abrasion-resistant coating are used to provide a long life of the tool 1.

Figure 4A:
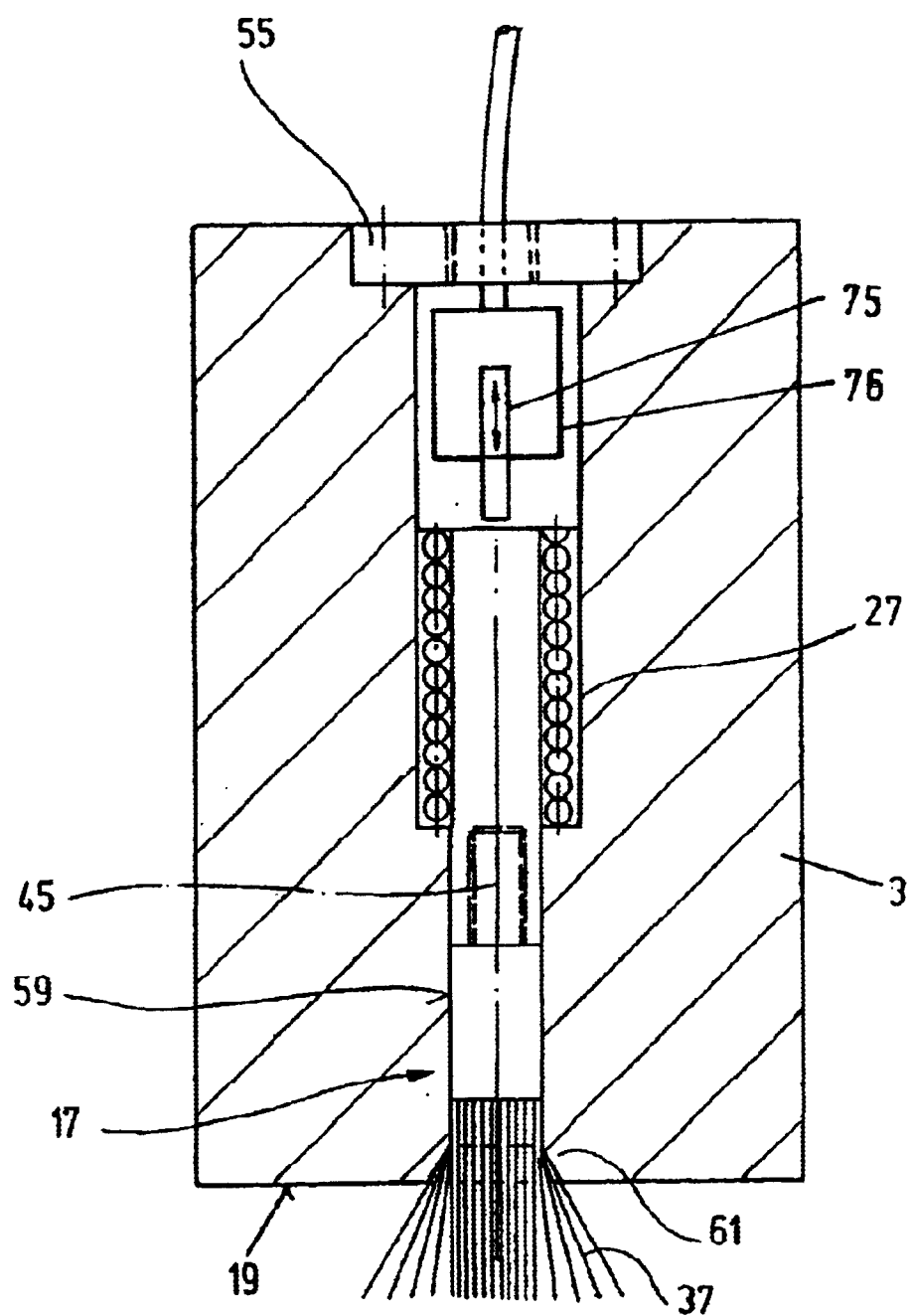
FIG. 4A is a view as in FIG. 4 showing an electromechanical actuation.

In addition, actuating devices 39 of different design activate and drive the deburring tools, namely such which retract and extend the deburring tools 17 electromechanically, may also be used as shown in FIG. 4A. In this figure, a magnetic element 75 and a solenoid 76 are provided in place of the actuating piston 41. The actuation of the solenoid moves the magnetic element to retract and extend the deburring tools. Finally, the actuating device 39 may be actuated as a function of rotational speed, for example by known bodies which, starting from a certain rotational speed, are displaced against the force of a spring and can thus be used for actuating the deburring tools 17. In this case, too, reversal of function is ultimately possible, that is displacement of the cutting edges relative to fixed wire brushes. Apart from that, in all cases, a combination of the various activation types (pneumatic, hydraulic, mechanical by centrifugal force, mechanical by means of an electromagnet) is possible to produce relative movement between cutting edges and deburring tool.

The tool 1 preferably has cutter tips 9, although displacement of the cutter tips is possible for exact adjustment of the tool 1. The deburring tools 17, that is the wire brushes 37, are displaceable by an actuating device 39, so that both machining and deburring of workpieces is possible using the tool 1. The tools required for machining workpieces, and also the space requirement of corresponding tool centers or machining installations, may be substantially reduced. In this case, the tool 1 is of simple construction and is less susceptible to trouble or wear.

Further, machining and deburring can be performed in the same operating cycle. This is achieved by the deburring tools already being activated, that is extended, during the machining.

This is a very time saving method of machining. However, the advantage of the method described above is that the two sequences of operations, machining and deburring, do not have an adverse effect on one another.

Although the present invention has been described in relation to a particular embodiment thereof, many other variations and modifications and other uses will become apparent to those skilled in the art. It is preferred, therefore, that the present invention be limited to not by the specific disclosure herein, but only by the appended claims.

What is claimed is:

1. A tool for machining a workpiece comprising:
  a rotatable main tool body having operating end;
  at least one cutting edge supported on the rotatable tool body and rotatable with the body for machining the workpiece;
  a deburring device at the main body of the tool and also rotatable with the body, the deburring device being selectively movable between an inactive position in the body of the tool and an active position exposed outside the operating end of the body of the tool enabling the deburring device to debur; and
  an actuating device operatively connected with the deburring device for selectively causing relative movement between the cutting edge and the deburring device so that the deburring device can be selectively moved between the positions thereof.

2. A tool for machining and deburring a workpiece, comprising:
  a main tool body having an operating end,
  at least one cutting edge disposed at the operating end of the tool body;
  a receptacle in the operating end of the tool body and a deburring tool receivable in the receptacle;
  a piston connected with the deburring tool for selectively moving the deburring tool from a retracted position in the tool body to an extended position out of the operating end of the tool body, whereby the same machining tool may be operated for machining a surface of a workpiece and for deburring the surface machined.

3. The tool of claim 1, wherein the deburring device comprises at least one deburring tool at the main body.

4. The device of claim 1, wherein the deburring device comprises a wire brush.

5. The tool of claim 4, wherein the wire brush is comprised of bristles having an abrasion resistant coating thereon.

6. The tool of claim 2, wherein the position of the cutting edge on the operating end of the tool is also adjustable.

7. A tool for machining a workpiece comprising:
  a rotatable main tool body having operating end;
  at least one cutting edge supported on the rotatable tool body and rotatable with the body for machining the workpiece;
  a deburring device at the main body of the tool and also rotatable with the body, the deburring device being selectively movable between an inactive position in the body of the tool and an active position exposed outside the operating end of the body of the tool enabling the deburring device to debur; and
  an actuating device operatively connected with the deburring device for selectively causing relative movement between the cutting edge and the deburring device so that the deburring device can be selectively moved between the positions thereof, wherein the actuating device is drivable hydraulically, pneumatically or electromagnetically.

8. The tool of claim 7, wherein the actuating device comprises an actuating piston which is driven to move with respect to the body of the tool.

9. The tool of claim 8, wherein the deburring device is supported on the actuating piston to be moved as the piston is moved.

10. A tool for machining a workpiece comprising:
  a rotatable main tool body having operating end;
  at least one cutting edge supported on the rotatable tool body and rotatable with the body for machining the workpiece;
  a deburring device at the main body of the tool and also rotatable with the body, the deburring device is selectively movable between an inactive position in the body of the tool and an active position exposed outside the operating end of the body of the tool enabling the deburring device to debur; and
  a cutter tip inserted onto the operating end of the main body of the tool and the cutting edge is supported on the cutter tip.

11. The tool of claim 6, further comprising a plurality of the cutting edges disposed around the tool, and the tool being rotatable for rotating the cutting edges over the surface to be machined.

12. A tool for machining a workpiece comprising:

a rotatable main tool body having operating end;

at least one cutting edge supported on the rotatable tool body and rotatable with the body for machining the workpiece;

a deburring device at the main body of the tool and also rotatable with the body, the deburring device is selectively movable between an inactive position in the body of the tool and an active position exposed outside the operating end of the body of the tool enabling the deburring device to debur, the tool having a plurality of the cutting edges arrayed around the tool at intervals; and a respective one of the deburring devices associated with each of the cutting edges for deburring a surface machined by the cutting edges.

13. The tool of claim 12, further comprising a respective activation device connected with each of the deburring tools for selectively activating the deburring tool between the active and inactive positions thereof.

14. The tool of claim 13, where each of the activation devices comprises a respective pneumatically activated piston connected with the deburring device for moving the deburring device between the active and inactive positions thereof.

15. The tool of claim 14, further comprising a pneumatic pressure supply to each of the pistons.

16. The tool of claim 11, further comprising a respective one of the deburring tools associated with each of the cutting edges and a respective receptacle in the tool main body for each of the deburring tools;

a respective actuating device associated with each of the deburring tools for selectively moving each of the deburring tools between the inactive and active positions thereof.

17. The tool of claim 16, further comprising a pneumatic or hydraulic connection to each of the actuating devices for selectively activating all of the actuating devices together between the retracted and extended positions thereof.

* * * * *

UNITED STATES PATENT AND TRADEMARK OFFICE
CERTIFICATE OF CORRECTION

PATENT NO. : 6,676,340 B2
DATED : January 13, 2004
INVENTOR(S) : Dieter Kress et al.

It is certified that error appears in the above-identified patent and that said Letters Patent is hereby corrected as shown below:

<u>Title page,</u>
Insert item:
-- Foreign Application Priority Data
[30] Sept. 11, 2000    GB .......... 100 44 978.7 --

Signed and Sealed this

Sixth Day of April, 2004

JON W. DUDAS
*Acting Director of the United States Patent and Trademark Office*

UNITED STATES PATENT AND TRADEMARK OFFICE
CERTIFICATE OF CORRECTION

PATENT NO. : 6,676,340 B2
DATED : January 13, 2004
INVENTOR(S) : Dieter Kress et al.

It is certified that error appears in the above-identified patent and that said Letters Patent is hereby corrected as shown below:

Title page,
Insert Item:

-- Foreign Application Priority Data

[30]  September 11, 2000       DE............. 100 44 972.7 --

Signed and Sealed this

Ninth Day of November, 2004

JON W. DUDAS
*Director of the United States Patent and Trademark Office*